Patented July 11, 1950

2,514,564

UNITED STATES PATENT OFFICE 2,514,564

CHLORINATED TERPENE SULFONE AND INSECTICIDAL COMPOSITION CONTAINING SAME

George Allen Buntin, Wilmington, Del., assignor to Hercules Powder Company, Wilmington, Del., a corporation of Delaware No Drawing. Application November 14, 1947, Serial No. 786,168

18 Claims. (Cl. 167—30)

1

This invention relates to new polychloro sulfones and more particularly to chlorinated terpene sulfones and to insecticidal compositions containing these polychloro terpene sulfones as the toxic ingredient.

In accordance with this invention it has been discovered that chlorinated terpene sulfones containing at least 40% chlorine may be prepared and that insecticidal compositions containing these chlorinated terpene sulfones containing from about 40% to about 75% chlorine possess an exceptionally high degree of insecticidal activity.

The following examples illustrate the preparation of the new polychloro terpene sulfones and the insecticidal activity of compositions containing them. All parts and percentages are by weight unless otherwise indicated.

Example 1

Isobornyl sulfone was prepared by oxidizing a solution of 192 parts of a purified isobornyl sulfide in 1000 parts of glacial acetic acid with 200 parts of a 30% solution of hydrogen peroxide. An immediate exothermic reaction took place on the addition of the peroxide and it was necessary to cool the reaction mixture during the addition of the remainder of the peroxide. The reaction mixture was then heated to 100° C. on a steam bath for 4 hours, after which it was poured into 2500 parts of ice water. The white precipitate that formed was filtered out, water washed, and dried. The isobornyl sulfone so prepared had a melting point of 117°–120° C.

The above isobornyl sulfone (137 parts) was dissolved in 600 parts of carbon tetrachloride and chlorine was passed through the agitated solution in the presence of ultraviolet illumination. The temperature rose during the chlorination to 150° F. Samples were taken at the end of 6, 13, 19 and 31½ hours of chlorination. The solvent was removed from each of these samples under reduced pressure using a nitrogen sparge. The product in each case was a viscous red liquid which upon cooling became a brittle solid. Each of these four chlorinated isobornyl sulfones was tested for its insecticidal activity against house flies. In this and the following examples, the test for insecticidal activity against house flies was made in the following manner and is referred to in this specification as the Bell Jar Method.

Approximately 100 five-day old flies (*Musca domestica*) were placed in a bell jar and a predetermined quantity of the insecticide to be tested was atomized into the bell jar. The quantity of insecticide used was equal to the amount of the Official Test Insecticide which was necessary to give a 30 to 55% kill and must be within the limits of 0.25 to 0.35 cc. After spraying the insecticide into the chamber the flies were placed in an observation cage containing a wad of cotton wet with a concentrated sugar solution. At the end of 24 hours the number of dead and moribund flies were counted. All tests were carried out at 80°–90° F. and 50–70% relative humidity.

The results of the analyses for chlorine content and of tests made on solutions of the above 4 chlorinated terpene sulfones in a 1:1 mixture of deodorized kerosene and acetone are given in the following table. The data are an average of a series of tests made on each solution.

| Chlorination Time in Hrs. | Chlorine | Concentration of Solution | Dead in 24 Hrs. | O. T. I. Difference |
|---|---|---|---|---|
| | Per cent | Per cent | Per cent | |
| 6 | 45.2 | 1 | 100 | +45 |
| 13 | 61.9 | 1 | 100 | +45 |
| | | 0.1 | 100 | +54 |
| | | 0.05 | 64 | +18 |
| 19 | 67.3 | 1 | 100 | +45 |
| | | 0.1 | 100 | +54 |
| | | 0.05 | 77 | +31 |
| 31.5 | 70.2 | 1 | 100 | +45 |
| | | 0.1 | 79 | +32 |

Example 2

Isobornyl lauryl sulfide was prepared by heating together 280 parts of camphene, 404 parts of lauryl mercaptan and 10 parts of an activated clay catalyst to a temperature of 110° C. for 16 hours. The reaction mixture was then filtered to remove the catalyst and was diluted with ether. The ethereal solution was washed with a saturated aqueous sodium carbonate solution and finally with water. The ether was distilled off under reduced pressure leaving a yellow liquid as a residue. The thioether so prepared was analyzed and found to contain 8.6% sulfur (theory 9.45%).

The above isobornyl lauryl sulfide (100 parts) dissolved in 300 parts of glacial acetic acid was oxidized by adding 120 parts of 30% hydrogen peroxide. The reaction mixture was allowed to stand for 5 days and then was heated at 100° C. on a steam bath for 5 hours after which it was poured into water. The organic layer was dissolved in ether and the ethereal solution was washed first with a sodium sulfite solution and then with a sodium carbonate solution. After drying with anhydrous sodium sulfate, the ether was distilled off and the isobornyl lauryl sulfone was obtained as a white semicrystalline solid.

Eighty parts of the above isobornyl lauryl sulfone were dissolved in 960 parts of carbon tetrachloride and chlorine was passed through the agitated solution in the presence of ultraviolet illumination. Samples were taken at the end of 8 and 14 hours of chlorination. The solvent was removed from each of these samples under reduced pressure using a nitrogen sparge, leaving viscous red liquids which cooled to hard solids in each case. The two chlorinated isobornyl sulfones containing 55.6 and 67.7% chlorine respectively were tested for their insecticidal activity by testing solutions of the sulfones in a 1:1 mixture of deodorized kerosene and acetone against house flies by the Bell Jar Method. Results of these tests are given in the following table.

| Chlorination Time in Hrs. | Chlorine | Concentration of Solution | Dead in 24 Hrs. | O. T. I. Difference |
|---|---|---|---|---|
| | Per cent | Per cent | Per cent | |
| 8 | 55.6 | 2.5 | 100 | +45 |
| | | 1 | 63 | +21 |
| 14 | 67.7 | 2.5 | 100 | +45 |
| | | 1 | 100 | +58 |
| | | 0.25 | 78 | +30 |

*Example 3*

Isobornyl phenyl sulfide was prepared by heating a mixture of 136 parts of camphene, 100 parts of thiophenol, 5 parts of activated clay and 22 parts of toluene to 110° C. for 16 hours. The catalyst was removed by filtration and the solvent and unreacted camphene were removed by sparging with nitrogen at 100° C. under reduced pressure. The isobornyl phenyl sulfide so prepared was a viscous yellow liquid containing 14.1% sulfur (theory 13.2%).

One hundred fifty parts of a 30% solution of hydrogen peroxide were added slowly with cooling to a solution of 125 parts of the above sulfide in 300 parts of glacial acetic acid. After the addition of the hydrogen peroxide the solution was heated on the steam bath for 3 hours and then was diluted with ether and poured into water. The ether layer was washed with aqueous sodium bicarbonate, aqueous sodium bisulfite and then with water, after which it was dried over anhydrous sulfate. The ether was removed by distillation under reduced pressure, a white solid being left as a residue. On recrystallization from aqueous ethanol the isobornyl phenyl sulfone was obtained as white platelets having a melting point of 73°–76° C.

One hundred parts of the above sulfone were dissolved in 1100 parts of carbon tetrachloride and chlorine was passed into the agitated solution in the presence of ultraviolet illumination, the temperature rising to 135° F. during the chlorination. Samples were removed after 4½, 11 and 16 hours of chlorination. The carbon tetrachloride was removed from each of these samples under reduced pressure using a nitrogen sparge whereby in each case a very viscous yellow liquid was obtained as a residue which upon cooling became a brittle solid. These chlorinated isobornyl phenyl sulfones were tested for their insecticidal activity against house flies by testing solutions of the sulfones in a 1:1 mixture of deodorized kerosene and acetone by the Bell Jar Method. The results of these tests are given in the following table.

| Chlorination Time in Hrs. | Chlorine | Concentration of Solution | Dead in 24 Hrs. | O. T. I. Difference |
|---|---|---|---|---|
| | Per cent | Per cent | Per cent | |
| 4.5 | 57.9 | 1 | 100 | +44 |
| | | 0.1 | 100 | +53 |
| | | 0.05 | 55 | +5 |
| 11 | 69.6 | 1 | 100 | +44 |
| | | 0.1 | 100 | +53 |
| | | 0.05 | 93 | +45 |
| 16 | 73.0 | 1 | 100 | +44 |
| | | 0.1 | 55 | +7 |

*Example 4*

A terpinyl tert.-butyl sulfide, prepared by reacting α-pinene with tert.-butyl mercaptan, was a water-white liquid boiling at 87°–102° C. at 0.5 mm. pressure and contained 13.7% sulfur (theory 14.1%). One hundred parts of this sulfide were dissolved in 300 parts of glacial acetic acid and oxidized with 120 parts of 30% hydrogen peroxide, the reaction mixture being cooled during addition of the peroxide. After standing 5 days, the reaction mixture was heated at 100° C. for 3 hours. It was then diluted with ether and poured into water. The ether layer was washed with an aqueous sodium bicarbonate solution, an aqueous sodium bisulfite solution, and finally with water, and then was dried over sodium sulfate. The ether was removed by distilling under reduced pressure using a nitrogen sparge. The terpinyl tert.-butyl sulfone which remained as a residue was a very viscous red liquid.

Sixty parts of the above sulfone were dissolved in 800 parts of carbon tetrachloride and chlorine was passed into the agitated solution in the presence of ultraviolet illumination. The temperature rose to 140° F. during the chlorination. Samples were taken at the end of 5 and 14½ hours of chlorination. The solvent was removed from each sample under reduced pressure using a nitrogen sparge. The chlorinated terpinyl tert.-butyl sulfones were viscous red liquids containing 40.9 and 57.4% chlorine respectively. Solutions of these chlorinated sulfones in a 1:1 mixture of deodorized kerosene and acetone were tested for their insecticidal activity against house flies by the Bell Jar Method. Results of these tests are given in the following table.

| Chlorination Time in Hrs. | Chlorine | Concentration of Solution | Dead in 24 Hrs. | O. T. I. Difference |
|---|---|---|---|---|
| | Per cent | Per cent | Per cent | |
| 5 | 40.9 | 5 | 88 | +40 |
| 14.5 | 57.4 | 5 | 100 | +48 |
| | | 1 | 100 | +48 |

The terpene sulfones which are chlorinated to produce the chlorinated terpene sulfones of this invention may be obtained by the oxidation of a terpene sulfide or thioether. The sulfide which is oxidized to the sulfone may be a simple terpene sulfide; i. e., $(C_{10}H_{17})_2S$, or it may be a mixed terpene sulfide; i. e., an alkyl, aryl, aralkyl, or cycloalkyl terpene sulfide. The simple terpene sulfides are readily prepared by reacting an unsaturated terpene with hydrogen sulfide in the presence of oxygen, or by reacting a haloterpene or dihydroterpene with an alkali metal sulfide. The mixed terpene sulfides are readily prepared by reacting an unsaturated terpene with an alkyl, aryl, aralkyl, or cycloalkyl mercaptan. The oxidation of the terpene sulfides to the sulfone may be carried out by reacting the terpene sulfide with an oxidizing agent as, for example, hydrogen peroxide, chromic acid, potassium permanganate, perbenzoic acid, etc.

In accordance with this invention, a terpene sulfone may be chlorinated to produce chlorinated terpene sulfones containing at least 40% chlorine, preferably about 40% to about 75% chlorine, and more preferably about 55% to about 70% chlorine. The terpene sulfones which may be chlorinated in accordance with this invention may be any sulfone containing a terpene or dihydroterpene radical attached to the sulfur atom.

Thus, the sulfone may be a simple mono- or bicyclic terpene or dihydroterpene sulfone such as isobornyl sulfone, bornyl sulfone, fenchyl sulfone, isofenchyl sulfone, terpinyl sulfone, menthyl sulfone, etc. The sulfone may also be one containing a single terpene radical as, for example, an alkyl terpene sulfone such as methyl, ethyl, tert.-butyl, amyl, etc., isobornyl sulfone, an aryl terpene sulfone such as phenyl isobornyl sulfone, an aralkyl terpene sulfone such as benzyl isobornyl sulfone, or a cycloalkyl terpene sulfone such as cyclohexyl terpene sulfone. The terpene radical in these sulfones may have been derived from any terpene or dihydroterpene as, for example, such bicyclic terpenes as camphene, camphane, isocamphane, bornylene, pinene, pinane and monocyclic terpenes such as dipentene, terpinolene, terpinene, carvomenthene, menthene, and dihydroterpinolene, etc.

The chlorination of the terpene sulfone may be carried out by passing chlorine into a solution of the sulfone in an inert solvent. Suitable solvents for the chlorination are chloroform, carbon tetrachloride, pentachloroethane, etc. A chlorination catalyst such as ultraviolet light or an organic peroxide such as benzoyl peroxide may be used if desired.

The polychloro terpene sulfones in accordance with this invention should contain an amount of chlorine equal to at least 40%, preferably about 40% to about 75% and more preferably about 55% to about 70%. As may be seen from the foregoing examples, the chlorinated terpene sulfones containing at least 40% chlorine have a high insecticidal activity. Chlorinated terpene sulfones having less than 40% chlorine are so inactive as to be worthless as insecticides.

The insecticidal compositions of this invention may be made up of the polychloro terpene sulfone admixed with any suitable type of a diluent. If a liquid spray is desired, the chlorinated terpene sulfone may be dissolved in any convenient solvent such as deodorized kerosene, crude kerosene, aromatic solvents and alkylated aromatic solvents or it may be dispersed in water to form aqueous sprays. Insecticidal dusts may be prepared by placing the polychloro terpene sulfone on a solid diluent or carrier such as powdered carbon, kieselguhr, bentonite, pyrophyllite, etc.

The chlorinated terpene sulfones may be used in combination with other insecticidal toxicants, if desired. Examples of toxicants which may be combined with the polychloro terpene sulfones are rotenone, pyrethrum, and organic thiocyanates such as alkyl thiocyanates, thiocyano ethers such as $\beta$-butoxy-$\beta'$-thiocyanoethyl ether, and terpene thiocyanoacylates such as isobornyl thiocyanoacetate, fenchyl thiocyanoacetate and isobornyl $\alpha$-thiocyanopropionate.

The chlorinated terpene sulfones are useful in combating flies, mosquitoes, roaches, moths and many other insect pests. These new products have an extremely high insecticidal activity, some of them giving a 100% kill against houseflies even at a concentration of 0.05%. The amount of the polychloro terpene sulfone to be admixed with the diluent depends upon the use to which the insecticidal composition will be put. For example, for use as a household fly spray, a solution containing 0.1% of these compounds could be used, although for general effectiveness 1 to 2% solutions may be used, but when used as an agricultural dust a concentration of 10 to 20% or more may be desirable. Thus, the amount of the polychloro terpene sulfone in the insecticidal composition is determined by its ultimate use.

What I claim and desire to protect by Letters Patent is:

1. A chlorinated terpene sulfone containing at least 40% chlorine.
2. A chlorinated di-terpene sulfone containing at least 40% chlorine.
3. A chlorinated terpene alkyl sulfone containing at least 40% chlorine.
4. A chlorinated terpene aryl sulfone containing at least 40% chlorine.
5. A chlorinated monocyclic terpene sulfone containing from about 40% to about 75% chlorine.
6. A chlorinated bicyclic terpene sulfone containing from about 40% to about 75% chlorine.
7. A chlorinated bicyclic terpene alkyl sulfone containing from about 40% to about 75% chlorine.
8. A chlorinated bicyclic terpene aryl sulfone containing from about 40% to about 75% chlorine.
9. A chlorinated di-isobornyl sulfone containing from about 40% to about 75% chlorine.
10. A chlorinated isobornyl lauryl sulfone containing from about 40% to about 75% chlorine.
11. A chlorinated isobornyl phenyl sulfone containing from about 40% to about 75% chlorine.
12. A chlorinated terpinyl tert.-butyl sulfone containing from about 40% to about 75% chlorine.
13. An insecticidal composition comprising a chlorinated terpene sulfone containing from about 40% to about 75% chlorine and a hydrocarbon solvent.
14. An insecticidal composition comprising an aqueous dispersion of a chlorinated terpene sulfone containing from about 40% to about 75% chlorine.
15. An insecticidal composition comprising a chlorinated terpene sulfone containing from about 40% to about 75% chlorine and a solid carrier.
16. An insecticidal composition comprising a chlorinated di-isobornyl sulfone containing from about 55% to about 70% chlorine and a hydrocarbon solvent.
17. An insecticidal composition comprising an aqueous dispersion of a chlorinated di-isobornyl sulfone containing from about 55% to about 70% chlorine.
18. An insecticidal composition comprising a chlorinated di-isobornyl sulfone containing from about 55% to about 70% chlorine and a solid carrier.

GEORGE ALLEN BUNTIN.

REFERENCES CITED

The following references are of record in the file of this patent:

UNITED STATES PATENTS

| Number | Name | Date |
|---|---|---|
| 2,209,184 | Borglin (B) | July 23, 1940 |
| 2,217,611 | Borglin (A) | Oct. 8, 1940 |
| 2,314,846 | McClellan | Mar. 23, 1943 |
| 2,425,185 | Haury | Aug. 5, 1947 |

FOREIGN PATENTS

| Number | Country | Date |
|---|---|---|
| 827,092 | France | Jan. 18, 1938 |
| 481,673 | Great Britain | Mar. 15, 1938 |